United States Patent
Gomez et al.

(10) Patent No.: US 6,301,552 B1
(45) Date of Patent: Oct. 9, 2001

(54) RADAR/IFF SIMULATOR CIRCUIT FOR DESKTOP COMPUTER

(75) Inventors: Aldan D. Gomez, El Cajon; Weldon J. Dahlke, San Diego; David B. Schmiedeberg, San Diego; Dwight R. Wilcox, San Diego; Peter N. Pham, San Diego, all of CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/181,024

(22) Filed: Oct. 27, 1998

(51) Int. Cl.[7] .................................................. G06F 17/50
(52) U.S. Cl. ..................................... 703/4; 703/2; 703/13; 342/169; 342/171
(58) Field of Search .................... 703/13, 17, 4, 703/2; 342/169, 170, 171, 168; 702/111, 106

(56) References Cited

U.S. PATENT DOCUMENTS

| | | | |
|---|---|---|---|
| 3,783,447 | 1/1974 | Sanders . | |
| 3,903,521 * | 9/1975 | Jensen et al. ........................ | 343/17.7 |
| 4,204,342 | 5/1980 | Linfield . | |
| 4,339,754 | 7/1982 | Hammers et al. . | |
| 4,553,145 | 11/1985 | Evans . | |
| 4,752,825 * | 6/1988 | Buckley et al. ...................... | 358/139 |
| 4,998,112 | 3/1991 | Franchi et al. . | |
| 5,014,065 | 5/1991 | Andrieu et al. . | |
| 5,214,435 | 5/1993 | Lopez . | |
| 5,262,781 | 11/1993 | Evans . | |
| 5,278,565 | 1/1994 | Horn . | |
| 5,283,585 | 2/1994 | Kneale . | |
| 5,329,286 | 7/1994 | Lammers et al. . | |
| 5,333,244 | 7/1994 | Harashima . | |
| 5,396,255 | 3/1995 | Durkota et al. . | |
| 5,410,319 | 4/1995 | Lopez et al. . | |
| 5,457,463 * | 10/1995 | Vencel et al. ......................... | 342/169 |
| 5,515,301 | 5/1996 | Corby, Jr. et al. . | |
| 5,554,991 | 9/1996 | Maitre et al. . | |
| 5,579,241 | 11/1996 | Corby, Jr. et al. . | |
| 5,583,972 | 12/1996 | Miller . | |
| 5,604,891 | 2/1997 | Burnett et al. . | |
| 5,608,849 | 3/1997 | King, Jr. . | |
| 5,870,055 * | 2/1999 | Kim ....................................... | 342/169 |
| 5,999,168 * | 12/1999 | Rosenberg et al. ................... | 345/161 |
| 6,067,041 * | 3/2000 | Kaiser et al. ......................... | 342/171 |
| 6,075,480 * | 6/2000 | Deliberis .............................. | 342/169 |
| 6,078,281 * | 6/2000 | Milkovich et al. ................... | 342/196 |
| 6,081,225 * | 6/2000 | Tsai et al. ............................. | 342/195 |

* cited by examiner

Primary Examiner—Kevin J. Teska
Assistant Examiner—Thai Phan
(74) Attorney, Agent, or Firm—Harvey Fendelman; James A. Ward; Eric James Whitesell

(57) ABSTRACT

A radar target simulator outputs multiple video and timing signals for a selected radar type from a single computer bus card slot. Several targets including cluster targets may be simulated at conveniently selectable signal-to-noise ratios. Multiple radar types may be simulated concurrently using additional bus card slots in a single desktop computer.

13 Claims, 8 Drawing Sheets

RADAR/IFF SIMULATOR CIRCUIT FOR DESKTOP COMPUTER

LICENSING INFORMATION

The invention described below is assigned to the United States Government and is available for licensing commercially. Technical and licensing inquiries may be directed to Harvey Fendelman, Legal Counsel For Patents, Space and Naval Warfare Systems Center D0012, 53510 Silvergate Avenue, San Diego, Calif. 92152-5765; telephone no. (619) 553-3001; fax no. (619)553-3821.

BACKGROUND OF THE INVENTION

The present invention relates generally to radar simulators and more particularly to the simulation of video and timing signals from two-dimension radars.

Currently two-dimension radar simulators typically require a suite of electronic circuit boards and computers to generate simulated radar target signals. These simulators generally require considerable space and usually simulate targets for only one radar type per equipment enclosure.

A continuing need exists for a compact radar target simulator that is readily transportable to different sites for testing radar signal processing equipment.

SUMMARY OF THE INVENTION

A radar target simulator of the present invention outputs multiple video and timing signals for a selected radar type from a single computer bus card slot. Several targets including cluster targets may be simulated at conveniently selectable signal-to-noise ratios. Multiple radar types may be simulated concurrently using additional bus card slots in a single desktop computer.

An advantage of the radar target simulator of the present invention is that radar video and timing signals may be output concurrently from a single computer bus card slot for each selected radar type, reducing the size and cost of equipment typically required for radar simulators.

Another advantage is that noise may be added to the video signals at selectable signal-to-noise ratios to simulate interference.

Still another advantage is that several different video waveforms and digital noise levels may be selected from a single function generator under software control using the same hardware.

Yet another advantage is that radar clutter may be simulated with or without added noise at a selected amplitude at relatively low computer data transfer rates.

Another advantage is that a radar simulator of the present invention may be constructed and packaged on a computer bus slot card to output multiple radar video and timing signals for a selected radar type.

Still another advantage is that a different radar type may be simulated for each radar simulator card installed in a single desktop computer.

DESCRIPTION OF THE INVENTION

Figure 1:
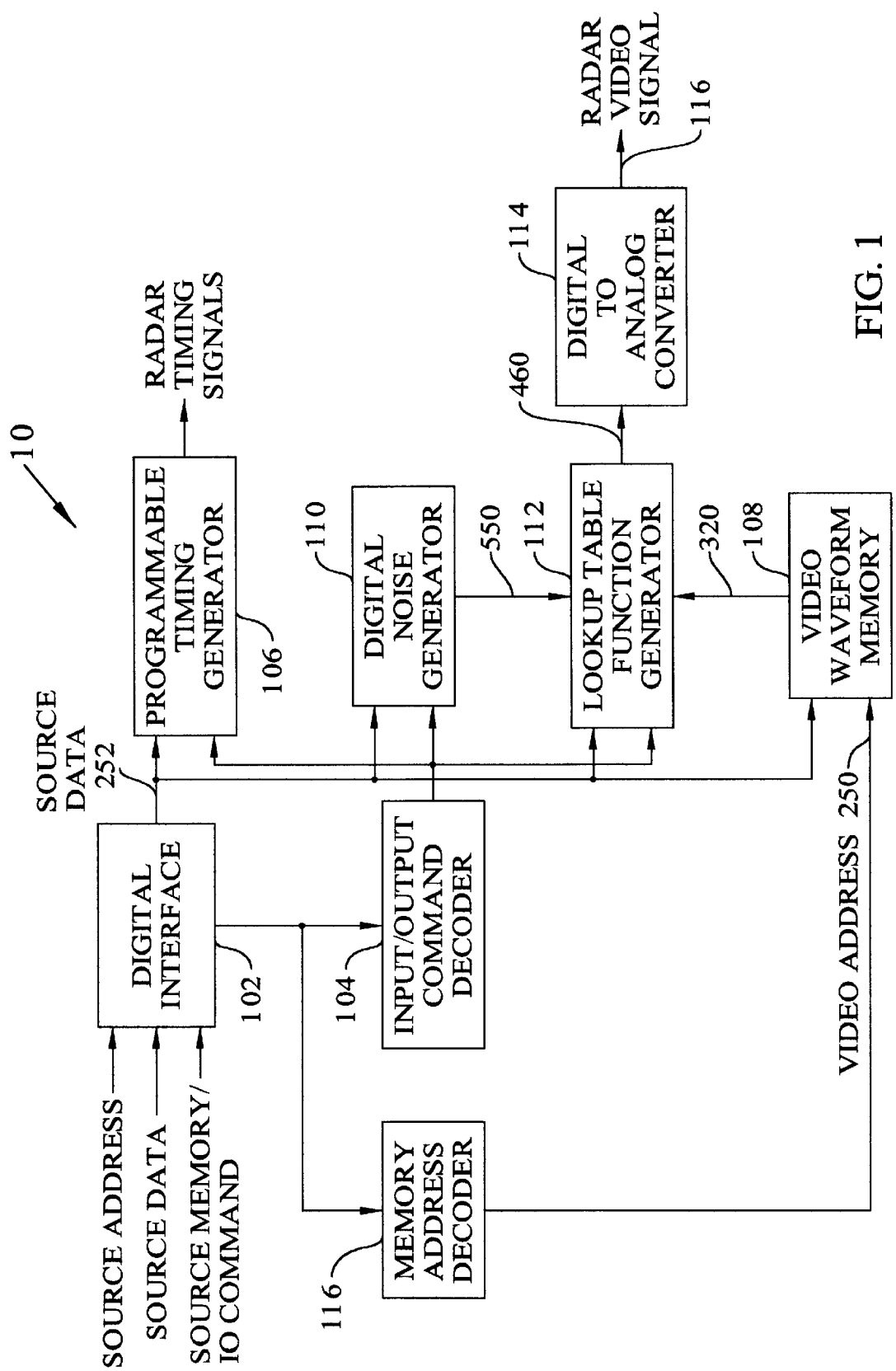
FIG. 1 is a block diagram of a radar simulator circuit of the present invention.

Referring to FIG. 1, a radar simulator circuit 10 of the present invention comprises a digital interface 102, a command decoder 104, a memory address decoder 116, a programmable timing generator 106, a video waveform memory 108, a digital noise generator 110, a lookup table function generator 112, and a digital-to-analog converter 114. Digital interface 102 buffers data and data transfer commands from the computer bus to I/O command decoder 104, memory address decoder 116, programmable timing generator 106, digital noise generator 110, lookup table function generator 112, and video waveform memory 108. Radar simulator circuit 10 may be constructed according to well known techniques, for example, on a desktop computer ISA bus slot card. Other computer bus types may also be readily implemented, such as PCI, Compact PCI, and VME. Source memory addresses and source memory/IO commands output from digital interface 102 are decoded by command decoder 104 and memory address decoder 116 respectively for transferring source data 252 from digital interface 102.

Programmable timing generator 106 outputs radar timing signals including a master clock, pre-trigger (P-TRG), azimuth reference pulse (ARP), azimuth change pulse (ACP), radar master trigger (TM)/Radar Display Distribution System (RADDS), and pulse repetition rate (PRF).

Video waveform memory 108 inputs source data 252 from digital interface 102 and outputs radar target waveform 320 to lookup table function generator 112.

Digital noise generator 110 outputs a sequence of noise samples 550 to lookup table function generator 112.

Table lookup function generator 112 forms a lookup table address from noise samples 550 and radar target waveform 320 and outputs a corresponding lookup table transform function value 460 to digital to analog converter 114.

Digital to analog converter 114 converts digital transform function values 460 from function generator 112 to a radar video signal 116.

Figure 2:
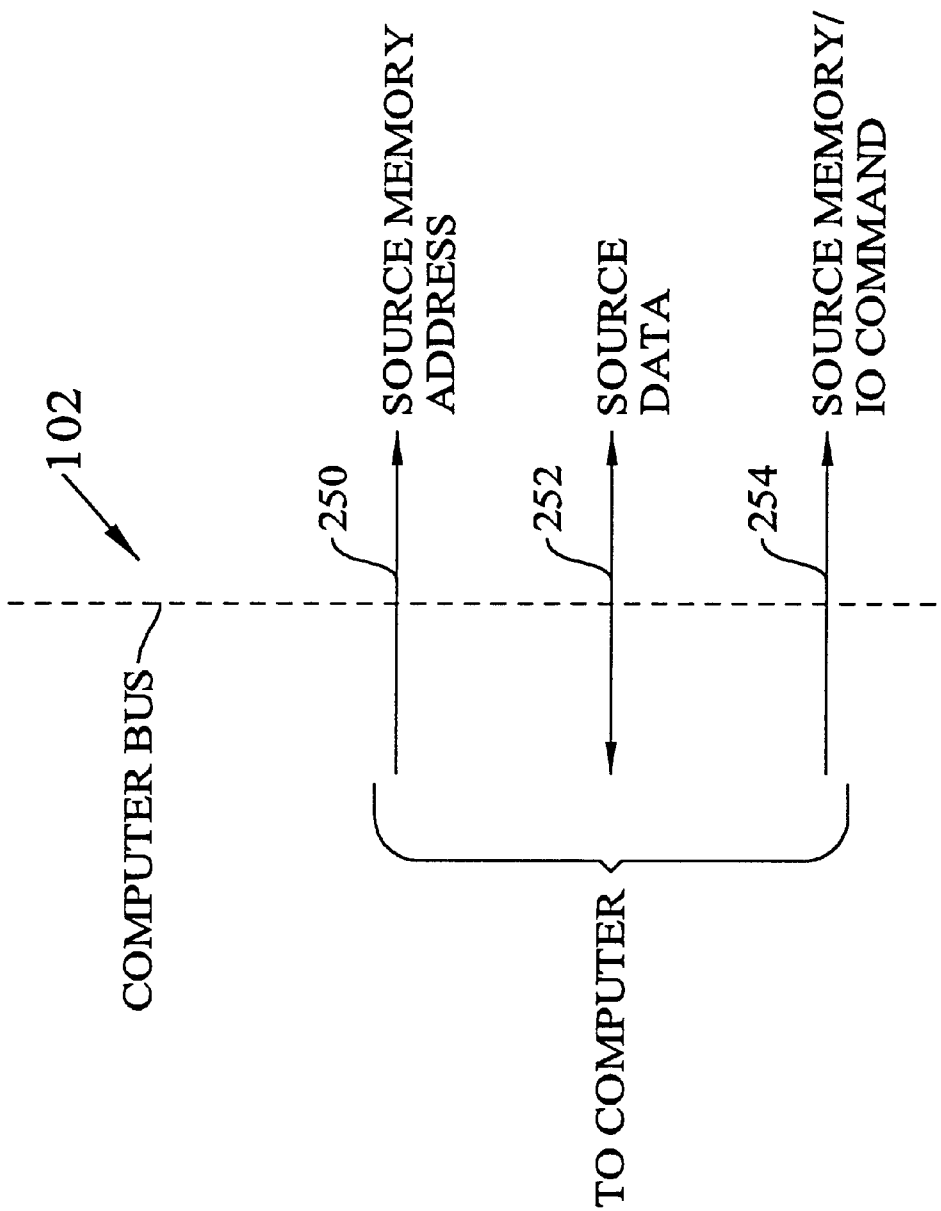
FIG. 2 is a block diagram of an exemplary digital interface.

FIG. 2 is a block diagram of an exemplary data interface 102 that may be, for example, an extension of a computer ISA bus. Source memory address source 250, bidirectional source data 252, and source memory/IO commands 254 are typically buffered from the computer and input to radar target simulator 10 over the computer bus.

Figure 3:
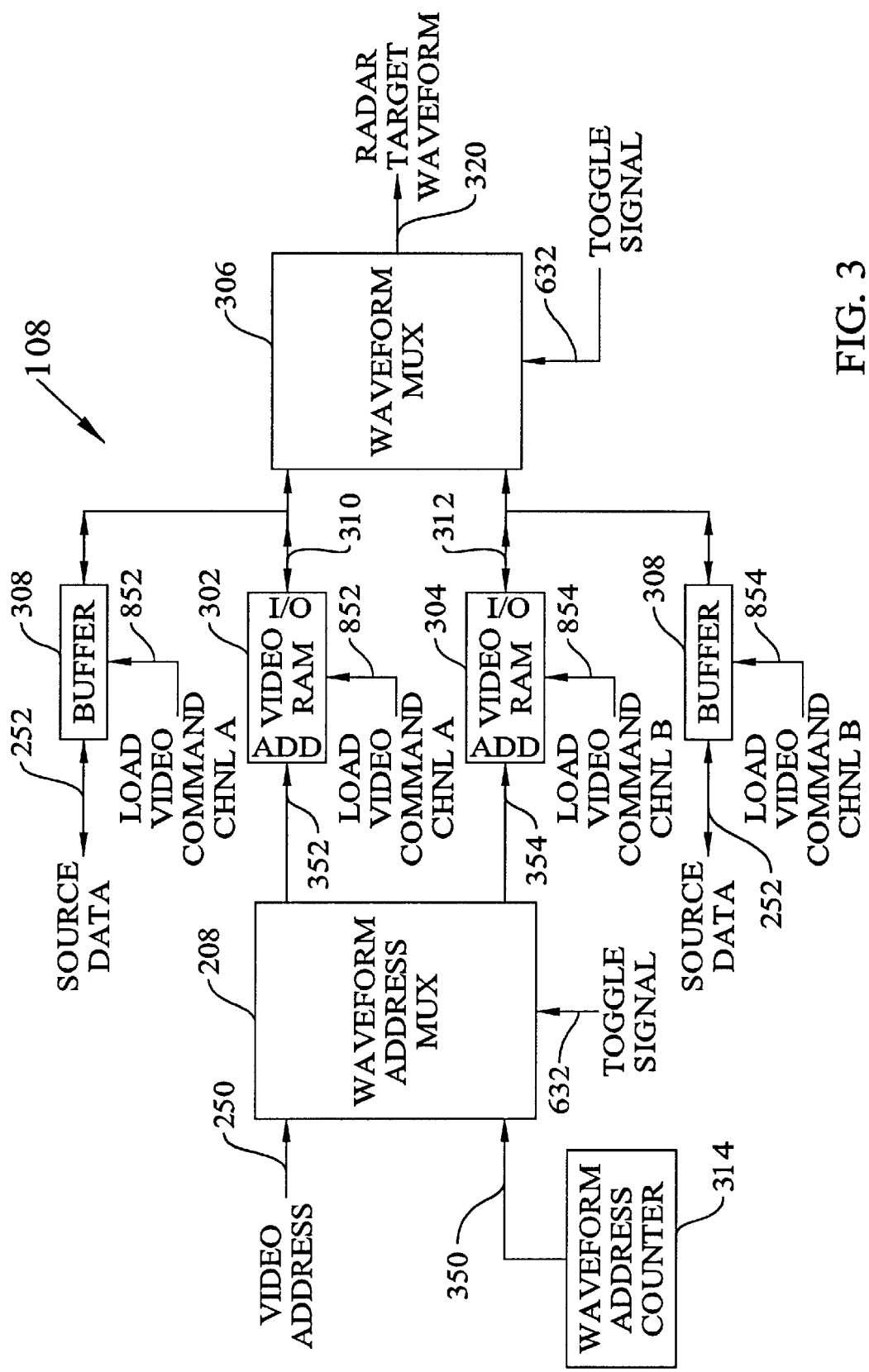
FIG. 3 is a block diagram of an exemplary video memory.

FIG. 3 is a block diagram of an exemplary video waveform memory circuit 108. In response to toggle signal 632, waveform address multiplexer 208 alternately outputs video address 250 from memory address decoder 116 and waveform counter output 350 from waveform counter 314 to video RAM inputs 352 and 354 respectively. Toggle signal 632 toggles between "1" and "0" with each new PRF cycle. In this example, when toggle signal 632 switches to "1", video RAM 302 inputs source data 252 representative of radar target waveform data 320 from data interface 102 while video RAM 304 outputs radar target waveform 320 loaded on the previous PRF cycle, i.e. Radial Line Time, to waveform multiplexer 306. Waveform video multiplexer 306 selects waveform video output 312 from video RAM 304 in response to toggle signal 632 and outputs waveform samples 320 to lookup table function generator 112. When toggle signal 632 switches to "0" on the next PRF cycle, video RAM 304 inputs source data 252 from data interface 102 while video RAM 302 outputs radar target waveform 320 loaded on the previous PRF cycle to waveform multiplexer 306. Waveform multiplexer 306 selects waveform video output 310 from video RAM 302 in response to toggle signal 632 and outputs waveform samples 320 to lookup table function generator 112. When toggle signal 632 switches to "1" again, the buffering continues in ping-pong fashion as described above. Video RAMs 302 and 304 may be, for example, 8K×8 video RAMs. Data buffers 308 connect video RAMs 302 and 304 to source data 252 for inputting waveform samples from data interface 102 in response to load video commands 852 and 854, respectively.

Figure 4:
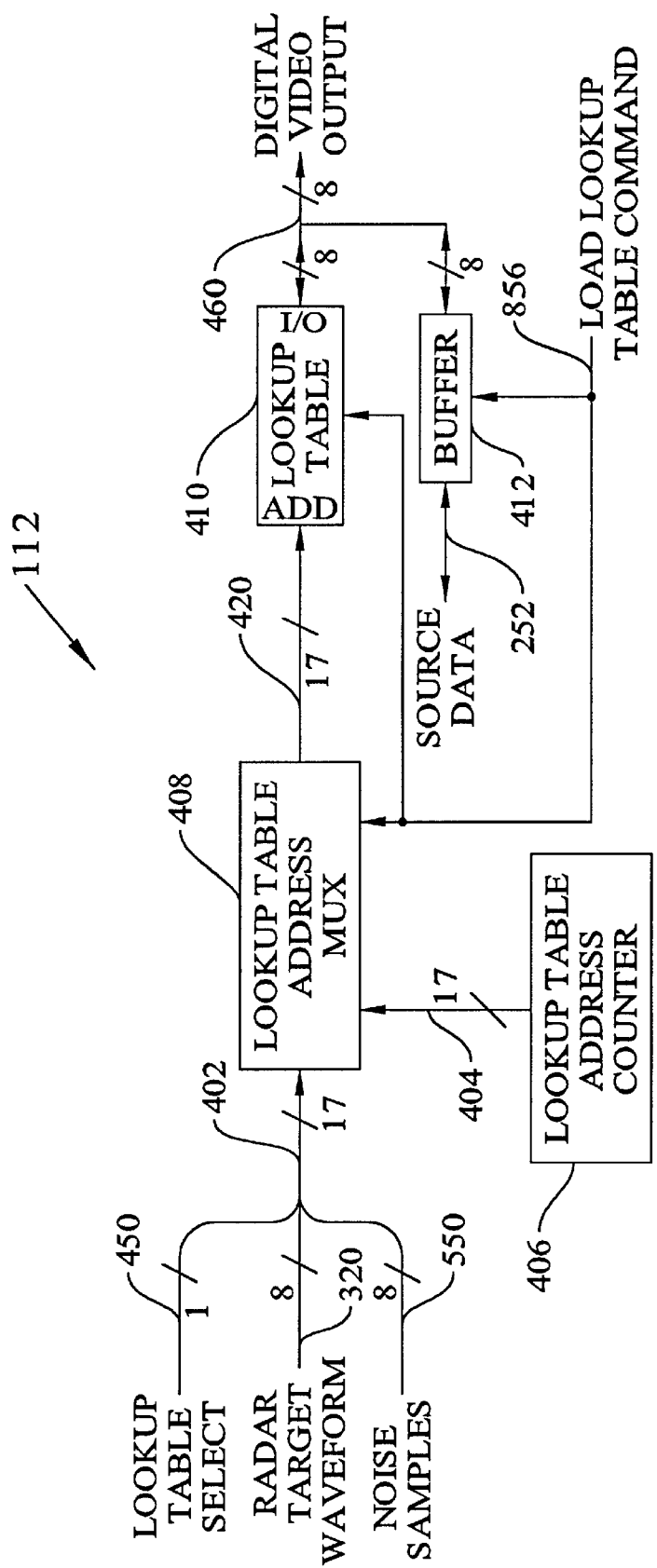
FIG. 4 is a block diagram of an exemplary table lookup function generator.

FIG. 4 is a block diagram of an exemplary lookup table function generator 112. A target lookup table address 402 is formed by concatenating the bits of lookup table select 450, radar target waveform 320, and noise samples 550. A lookup table load address 404 is generated by lookup table address counter 406. During loading of transform function values into lookup table 410, lookup table address multiplexer 408 outputs lookup table load address 404 in response to load lookup table command 856 from command decoder 104. For each target lookup table address 402 lookup table address multiplexer 408 outputs to lookup table 410, lookup table 410 outputs a transform function value to digital video output 460. Lookup table 410 may be, for example, a 128K×8K RAM. Lookup table select 450 may be used to select one of several different transform functions previously loaded into lookup table 410.

As shown in FIG. 1, digital-to-analog converter 114 inputs digital video output 460 to generate radar video signal 116. Radar video signal 116 may be displayed on a conventional oscilloscope synched by the pulse repetition frequency signal (PRF) from programmable timing generator 106. A storage oscilloscope may be preferable for observing changes in input waveform data as a function of azimuth angle.

Figure 5:
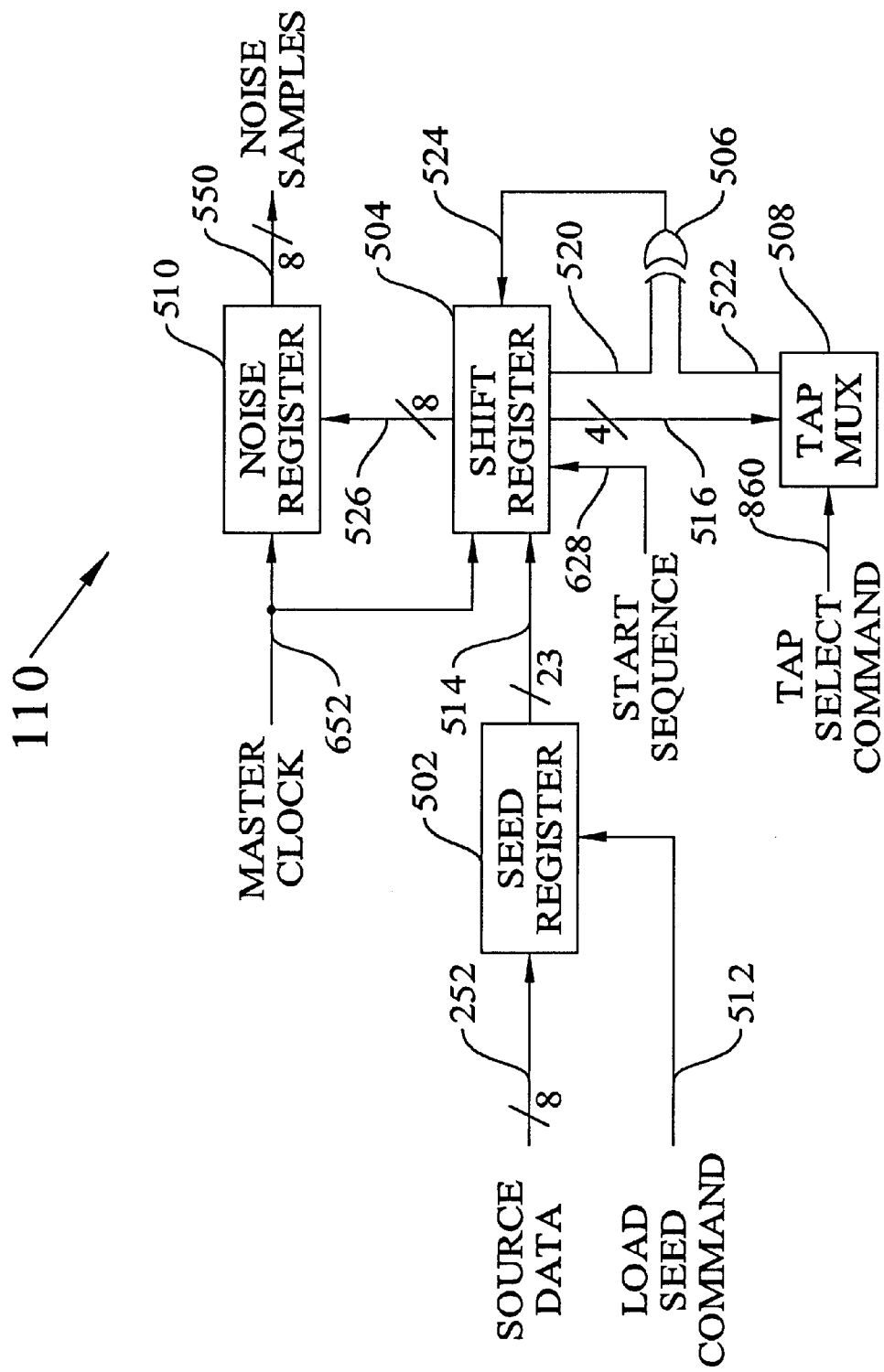
FIG. 5 is a block diagram of an exemplary digital noise generator.

Referring now to FIG. 5, an exemplary diagram of a digital noise generator 110 comprises a seed register 502, a 23-bit shift register 504, an exclusive-OR gate 506, a tap multiplexer 508, and a noise register 510. In this example, a different maximum-length pseudorandom noise sequence may be generated for each of four taps 516 of tap multiplexer 508. Seed register 502 loads a 23-bit pseudo-random noise generator seed from source data 252 in response to a load seed command 858 from command decoder 104. Upon receipt of a start sequence signal 628, shift register 504 loads 23-bit pseudo-random noise generator seed 514 from seed register 502. Tap multiplexer 508 gates one of tap outputs 516 selected by tap select command 860 in response to each master clock pulse 652 to input 522 of exclusive-OR gate 506. Exclusive-OR gate 506 inputs shift register serial output 520 and generates serial input 524. Shift register 504 is clocked by master clock 652 to generate parallel output 526. Noise register 510 latches parallel output 526 with each master clock 652 and outputs latched parallel output 526 as noise samples 550. Parallel output 526 is typically a subset of the number of parallel bits output by shift register 504 that includes a state where all bits have a value of zero.

Figure 6:
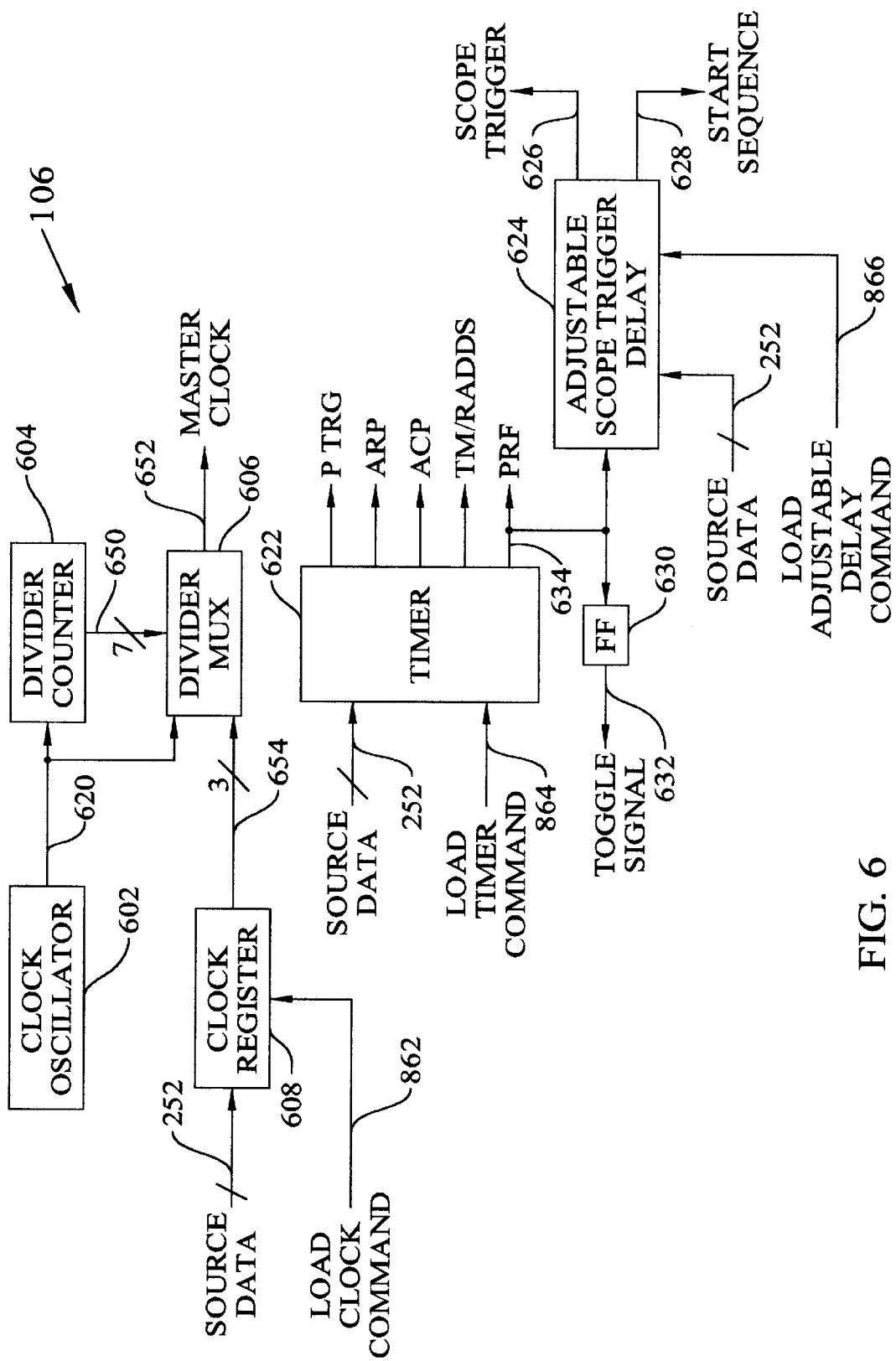
FIG. 6 is a block diagram of an exemplary programmable timing generator.

FIG. 6 is a diagram of an exemplary programmable timing generator 106. A clock oscillator 602 generates a maximum radar clock frequency 620 at, for example, 41.96 MHZ. In this example, clock frequency 620 is divided by a divider counter 604 to generate seven parallel lower frequency clock outputs 650. A clock register 608 outputs a 3-bit clock select signal 654 to divider multiplexer 606. Clock register 608 may be loaded with the clock select signal from source data 252 upon receipt of a load clock command 862. Divider multiplexer 606 selects one of parallel clock outputs 650 according to clock select signal 654 and outputs the selected clock frequency as master clock 652. In this example, the master clock frequency is given by 41.96 MHZ/$2^N$, where N has a value 0–7 corresponding to clock select signal 654.

Still referring to FIG. 6, a timer 622 generates radar timing signals including pre-trigger (P-TRG), azimuth reference pulse (ARP), azimuth change pulse (ACP), radar master trigger (TM)/Radar Display Distribution System (RADDS), and pulse repetition rate (PRF) according to well known techniques. Timer 622 may be programmed to select the timing signal frequencies by loading timing data from source data 252 upon receipt of a load timer command 864 from command decoder 104.

An adjustable scope trigger delay 624 may also be included to generate a scope trigger at a selected point of a repeating diagnostic test pattern. A selected scope trigger delay may be input from source data 252 upon receipt of a load adjustable delay command 866 from command decoder 104. Start sequence signal 628 is used to restart noise generator 110 at the beginning of each pulse rate frequency cycle to generate a repeating pattern that appears fixed on an oscilloscope for test functions.

Figure 7:
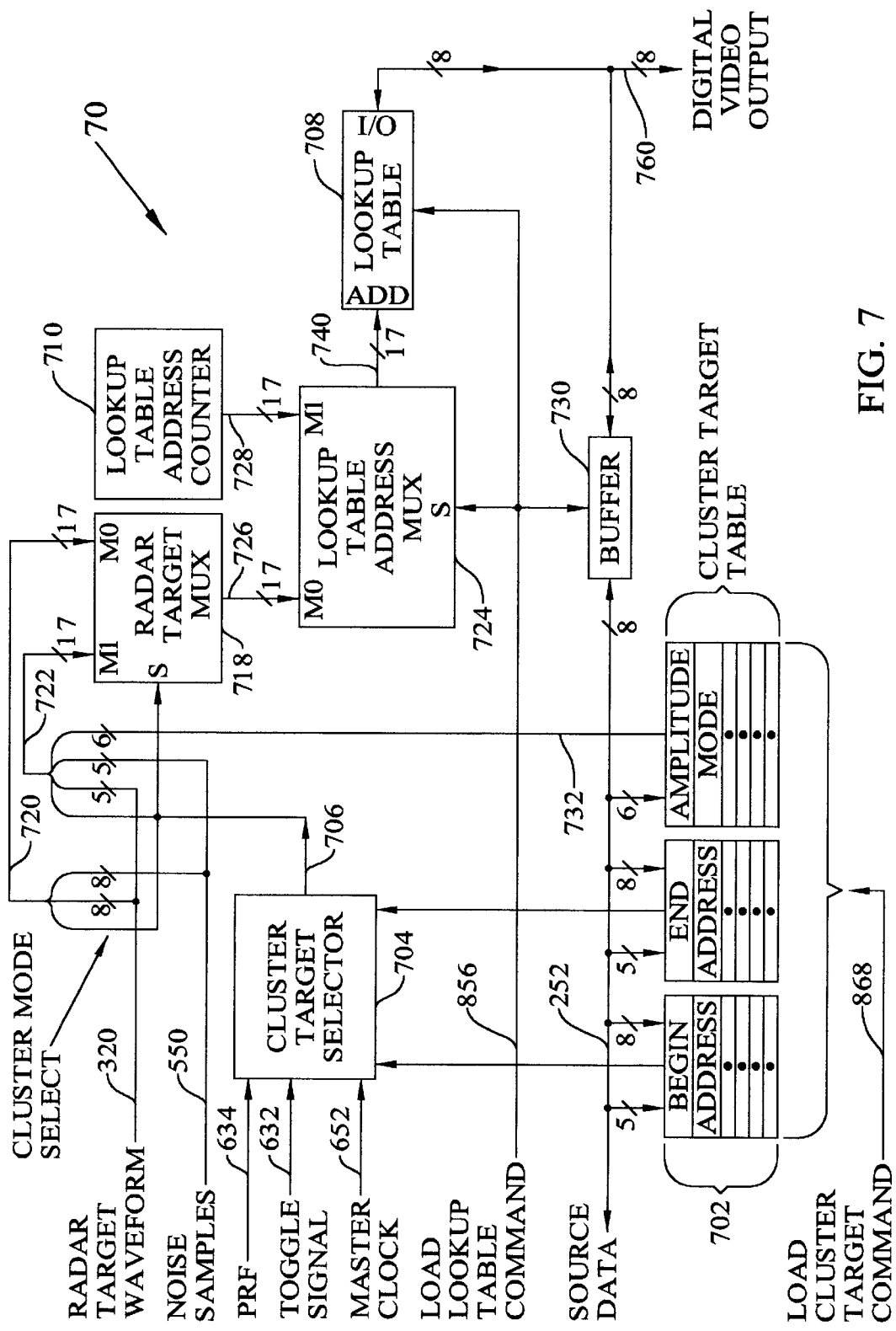
FIG. 7 is a block diagram of an alternative table lookup function generator for simulating multiple radar targets.

FIG. 7 is a block diagram of an alternative table lookup function generator 70 for simulating multiple radar targets within radar clutter at a selected signal-to-noise ratio. A cluster target table 702 is initially loaded with a beginning address, an ending address, and an amplitude mode for each cluster target when a load cluster target 868 command is asserted by source I/O command decoder 104. A cluster target selector 704 is implemented, for example, in a portion of a programmable logic array. Cluster target selector 704 compares a selected beginning address and ending address entry from cluster target table 702 with the output of a current address counter internal to target selector 704. The internal address counter is reset by PRF 634 and incremented by each master clock 652. If the current address lies within the range of the beginning and ending address, cluster mode select 706 is set to "1". If the current address lies outside the range of the beginning and ending address, cluster mode select 706 is set to "0".

When cluster mode select 706 is "0", cluster target multiplexer 718 selects single target address 720. Single target address 720 is formed by joining the lines of cluster mode select 706, radar target waveform 320, and noise samples 550. In this example, there is one line for cluster mode select 706, eight lines for radar target waveform 320, and eight lines for noise samples 550.

When cluster mode select 706 is "1", cluster target multiplexer 718 selects cluster target address 722. Cluster target address 722 is formed by joining the lines of cluster mode select 706, radar target waveform 320, noise samples 550, and amplitude mode 732. In this example, there is one line for cluster mode select 706, five lines for radar target waveform 320, five lines for noise samples 550, and six lines for amplitude mode 732.

Lookup table address multiplexer 724 inputs selected target address 726 output from radar target multiplexer 718 and lookup table address 728 from lookup table address counter 710. When load lookup table command 856 is "1", lookup table address multiplexer 724 outputs lookup table address 740 as selected table address 740 for loading function values into lookup table 708. When load lookup table command 856 is "0", lookup table address multiplexer 724 outputs selected target address 726 as selected table address 740 for outputting transform function values from lookup table 708. Lookup table 708 outputs a transform function value at digital transform function output 760 in response to each selected table address 740.

When load lookup table command 856 is "1", transform function values are loaded into lookup table 708 from source data 252 via buffer 730 in response to load lookup table command 856.

Figure 8:
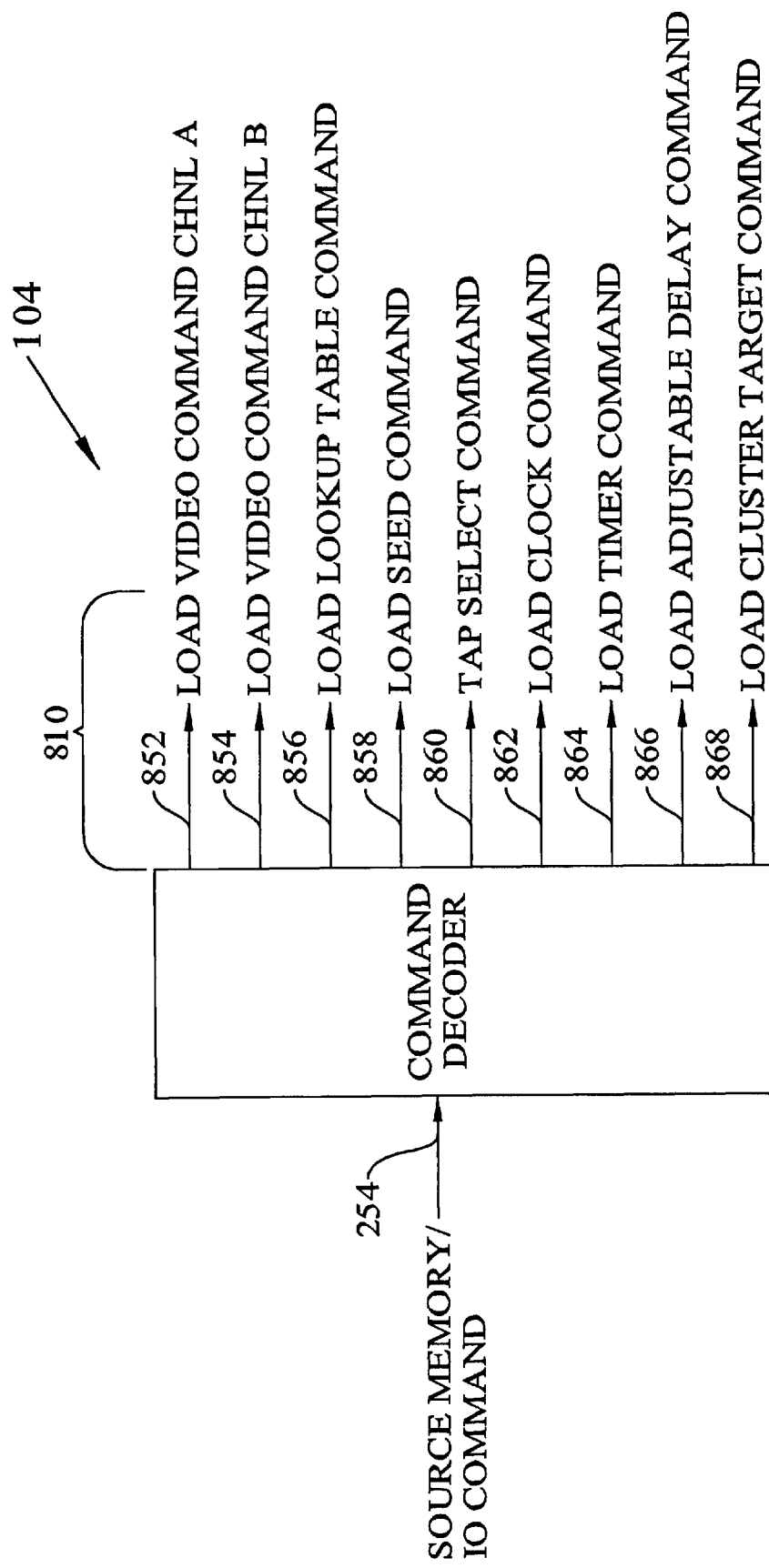
FIG. 8 is a block diagram of an exemplary command decoder.

FIG. 8 is a block diagram of an exemplary command decoder 104. Command decoder 104 may be, for example, a programmable logic array. When source I/O command 254 is received by command decoder 104, a corresponding command decoder output 810 enables a corresponding buffer to route source data 252 to the appropriate location in radar simulator circuit 10.

An electronic circuit may be constructed as described above and packaged on a computer bus expansion slot card to output multiple radar video signals. Several cards may be installed in one desktop computer to simulate several different radars.

Modifications and variations of the present invention may be made within the scope of the following claims to practice the invention otherwise than described in the examples above.

We claim:
1. In a personal computer (PC) having a receptacle coupled to a data bus, a radar video output simulator apparatus for generating a simulated radar video signal under computer program control, the apparatus comprising:
 a digital interface for coupling to the PC data bus to receive addresses, data, and memory input-output (IO) commands;
 a video waveform memory coupled to the digital interface for receiving and storing data representing simulated multi radar target return waveforms;
 a digital noise generator coupled to the digital interface for generating data representing pseudorandom noise (PRN); and
 a lookup table (LUT) function generator coupled to the digital noise generator and to the video waveform memory for producing a digital signal representing a selectable transformation of a combination of the PRN and the radar target return waveform.
2. The apparatus of claim 1 further comprising in the LUT function generator:
 a target selector for defining and selecting a beginning range, an ending range, and a target amplitude corresponding to one or more target return waveforms;
 a target multiplexer coupled to the target selector for selecting a LUT address corresponding to one of a single target return waveform plus noise and a cluster target return waveform plus noise;
 a LUT address counter for defining a LUT address for loading a transform function value into the LUT;
 a LUT address multiplexer coupled to the LUT address counter and the target multiplexer for selecting one of the target multiplexer signal and the LUT address counter signal; and
 a LUT coupled to the LUT address multiplexer for producing the digital signal representing a selectable transformation of a combination of the PRN and the radar target return waveform.
3. The apparatus of claim 2 further comprising:
 a programmable timing generator coupled to the digital interface for generating a plurality of radar display timing signals including a master clock signal, a pre-trigger (P-TRG) signal, an azimuth reference pulse (ARP) signal, an azimuth change pulse (ACP) signal, a Radar Display Distribution System (RADDS) master trigger (TM) signal and a pulse repetition rate (PRF) signal.
4. The apparatus of claim 3 further comprising:
 a digital-to-analog converter (DAC) coupled to the LUT function generator for producing an analog radar video signal corresponding to the selectable transformation of a combination of the PRN and the radar target return waveform.
5. The apparatus of claim 4 wherein the PRN has a bivariate Gaussian distribution.
6. The apparatus of claim 5 wherein the PC data bus receptacle comprises a PC expansion slot.
7. The apparatus of claim 6 wherein the apparatus is disposed in a single printed circuit board (PCB) with plug means for insertion into the PC data bus receptacle.
8. The apparatus of claim 7 wherein the PC data bus comprises:
 one of an Integrated Systems Architecture (ISA) bus, a Peripheral Component Interconnect (PCI) bus, a Compact PCI bus, and a Versa Module Europa (VME) bus.
9. The apparatus of claim 1 wherein the PC data bus receptacle comprises a PC expansion slot.
10. The apparatus of claim 9 wherein the apparatus is disposed in a single printed circuit board (PCB) with plug means for insertion into the PC data bus receptacle.
11. The apparatus of claim 1 further comprising:
 a programmable timing generator coupled to the digital interface for generating a plurality of radar display timing signals including a master clock signal, a pre-trigger (P-TRG) signal, an azimuth reference pulse (ARP) signal, an azimuth change pulse (ACP) signal, a Radar Display Distribution System (RADDS) master trigger (TM) signal and a pulse repetition rate (PRF) signal.
12. The apparatus of claim 11 further comprising:
 a digital-to-analog converter (DAC) coupled to the LUT function generator for producing an analog radar video signal corresponding to the selectable transformation of a combination of the PRN and the radar target return waveform.
13. The apparatus of claim 1 further comprising:
 a digital-to-analog converter (DAC) coupled to the LUT function generator for producing an analog radar video signal corresponding to the selectable transformation of a combination of the PRN and the radar target return waveform.

* * * * *